Inventors:
Cedric H. Flurscheim,
William G. C. Vance,
by Edwin Th__
Their Attorney.

Patented Aug. 3, 1948

2,446,415

UNITED STATES PATENT OFFICE 2,446,415

RETRACTABLE UNDERCARRIAGE FOR AIRCRAFT

Cedric Harold Flurscheim, Bowdon, and William Gerald Cooke Vance, Sale, England, assignors, by mesne assignments, to General Electric Company, a corporation of New York Application May 30, 1945, Serial No. 596,736
In Great Britain October 16, 1941

Section 1, Public Law 690, August 8, 1946
Patent expires October 16, 1961

7 Claims. (Cl. 244—102)

This invention relates to retractable undercarriages for aircraft and operating means therefor.

It is highly important that extension of a retractable undercarriage for aircraft should be ensured at all such times as may be desired in spite of difficulties which may be brought about due to jamming of operating parts, such, for example, as may be caused by weather conditions. Thus, while in the main, reliance is placed upon the gravitational effect to secure extension of an undercarriage, it has been proposed to assist such extension by utilising hydraulic jacks and the like whose primary function is to effect retraction.

The present invention has for its object to provide an improved form of retractable undercarriage and operating means therefor whereby the positive extension of the undercarriage as well as its retraction is ensured.

According to the invention a retractable undercarriage for aircraft in which the landing wheel, float or skid is adapted to carried at the end of a leg pivoted to the body of the aircraft and connected by a jointed strut whose other end is pivoted to the body of the aircraft, is provided with operating means comprising a chain or cable or equivalent motion-transmitting member connected to the jointed strut and passing over a reversible winch, which may conveniently be a sprocket wheel having associated driving means, for example an electric motor, whereby said sprocket and chain may at will be driven in either direction of rotation, said chain or cable or equivalent member passing through guiding means located between the driving sprocket or reversible winch and the jointed strut and so arranged that movement by pulling can be transmitted through the chain or equivalent member to break the joint of the strut for effecting retraction of the undercarriage when the sprocket or winch is driven in one direction while a movement by thrusting can be transmitted through the chain or equivalent member tending to straighten the jointed strut for effecting extension of the undercarriage when the sprocket or winch is driven in the opposite direction.

In practising the invention, provision may be made in some cases for enabling thrust to be imparted to the jointed strut through at least the initial part of the extension movement, while in other cases provision may be made whereby thrust is imparted to the jointed strut throughout the whole, or at least the major portion, of the extension movement.

Thus in one form of the invention wherein provision is made for imparting thrust to the jointed strut throughout the whole of the extension movement, there is provided for the whole length of a jointed chain, formed by side linkplates and jointing studs or rollers, lying between the driving sprocket and the connection of said chain to the jointed strut in the fully extended condition of the undercarriage, a guide chute in which the chain is adapted closely to fit, preferably by longitudinal runners engageable by the jointing studs or rollers of the chain, and through which it is adapted to pass on leaving the driving sprocket, said chute being arranged to swing about the axis of the driving sprocket in order to maintain correct alignment and engagement with the chain, whereby pull or thrust can be transmitted through the chain to the jointed strut according to the direction of rotation of the sprocket. Conveniently the guide chute may be hinged at one end to swing about the axis of the driving sprocket and arranged to be restrained at the other end but in such manner, for example by a pin and slot connection with the jointed strut, that said guide chute is withdrawn into the housing or nacelle with the other parts of the undercarriage assembly.

In another form of the invention there may be provided a jointed chain formed of pairs of side link-plates and jointing studs or rollers passing over a driving sprocket and attached at one end to the jointed strut, and guiding means for the chain conveniently in the form of a chute adapted closely to fiit the part of the chain lying at any time on the sprocket wheel and/or at least the part of the chain immediately between the sprocket and the connection to the jointed strut as it leaves the driving sprocket in the direction for effecting extension of the undercarriage, said guide chute being preferably formed with longitudinal runners engageable by the jointing studs of the chain, the free space between the driving sprocket and the point of connection with the jointed strut in the fully retracted condition of the undercarriage being occupied by a single elongated solid link which is also a close fit within the said guiding chute. With this arrangement, during rotation of the sprocket in the appropriate direction an initial thrust may be imparted to the jointed strut for commencing the extension movement and such thrust will continue until the said single solid link has passed beyond the end of the guiding means. The guiding means may be fixed, or in certain cases it may be arranged to be capable of swinging about the axis of the sprocket in order to ensure alignment and engagement with the chain during the retraction and extension movements. If the guiding means is arranged to swivel, it is advisable for same to be guided in regard to the movement of the toggle joint in order to prevent collapse during the part of the stroke in which thrust is transmitted through the chain.

In both of the above mentioned specific forms of the invention the tail of the chain may be accommodated in a housing conveniently secured to the underside of the body of the aircraft. Alternatively and preferably, the guide means for the tail or slack chain may be included in a common housing with the guide means for the part of the chain along which pull and thrust is imparted to the jointed strut, whereby to ensure that the portion of the chain at any time in contact with the driving sprocket subtends a large angle on the axis of the sprocket.

In certain cases it may be unnecessary or undesirable to provide separate latching means for the jointed strut. For example, where the undercarriage is maintained in the fully extended condition by thrust continuously applied through the chain or cable supported by the guiding means to prevent collapse of the jointed strut, such separate latching means may be unnecessary.

In this respect an important subsidiary feature of the invention resides in an arrangement whereby the complications and disadvantages of separate latching means for locking the jointed strut, and hence the undercarriage in the extended condition, may be obviated.

Thus, according to the invention, the chain or cable for making and breaking the jointed strut in effecting extension and retraction respectively of the undercarriage includes a pivoted linkage which, during the final part of the movement of the chain or cable for making the joint of the strut, is permitted by the said guiding means, rendering the chain or cable capable of transmitting thrust as well as pull as described, to collapse by movement of the joint of the linkage transversely of the general direction of the chain or cable, said guiding means providing an abutment for opposing movement of the link nearer the jointed strut in the direction for breaking the joint of the strut by force imparted thereto by said strut.

In a preferred form utilising a jointed chain for making and breaking the joint of the strut, the linkage is conveniently constituted by the two chain links nearest the jointed strut, the connection to the jointed strut being pivotal and the guide means for the chain being arranged at its end to allow the joint between the two links to move transversely of the general direction of the chain and to provide the aforesaid abutment whereby the link connected to the pivotal joint is constrained against movement by force imparted thereto by the jointed strut.

With this arrangement it is contemplated that during the final part of the movement of the chain along the guide in the direction to make the joint of the strut, the two links nearest the jointed strut will collapse immediately the joint therebetween is allowed by the guide means to move transversely of the general direction of the chain, the link pivoted to the strut pivoting about its joint with the strut and locking the joint of the strut by engagement of said link with the said abutment. As will be understood, shock reactions tending to break the joint of the strut, as, for example, by engagement of the landing element with the landing surface, will only have the effect of pushing the link pivoted to the strut against the said abutment.

Preferably, the guide means constitutes an elongated channel the walls of which closely engage the rollers of the chain over the greater part of the length from the winch up to the vicinity of the connection with the jointed strut whereat one wall is rounded and continued transversely of the general direction of the greater part of the guide to form the aforesaid abutment. Desirably the surface of the guide forming the abutment is of arcuate shape, preferably with its centre of radius at the axis of the pivotal joint of the link with the strut.

Advantageously the end link of the chain is pivoted to the knee or pivot of the jointed strut, conveniently to an extension of the pivot pin.

In addition to the positive latching of the jointed strut ensured by the arrangement described, it is an important advantage that the precise position assumed by the link pivoted to the strut at the end of the movement for making the joint of the strut is not material. Accordingly in such cases where limit switches are employed for controlling the power applied to the winch, as may be usual, accurate limit switching need not be required.

Advantageously the links of the jointed strut may be set slightly over toggle in the downward direction, namely with the normal reactions of the guiding frame in tension, in which case the collapsible linkage for the jointed strut will only be required to take up inertia reactions.

If desired, a spring may be incorporated between the collapsing parts, for example the last two links of the chain, so as to increase the tendency for these parts to collapse.

When the chain or cable is pulled upwardly in order to break the joint of the strut and effect retraction of the undercarriage, it will be appreciated that the collapsed linkage will be caused to straighten up before pull is imparted to the jointed strut for breaking the joint. Accordingly during the retraction movement there may be imparted to the jointed strut a slight jerk but with the links of the jointed strut on toggle such jerk will be applied solely to the links of the strut and only to a minor extent to the landing element, and the consequential movement of the landing element, if any, will be of an exceedingly small amount. In order to ensure that substantially no initial movement of the landing element will be caused it may be desirable for some resilience to be introduced into the chain or cable, for example in the form of a resilient link.

Where, however, a spring-pressed latching device is associated with the jointed strut for automatically locking the same in the straightened position corresponding to the fully extended condition of the undercarriage, it is necessary to arrange for the release of the latch in advance of the breaking of the jointed strut during the retraction operation. Accordingly for this purpose the chain, in addition to being attached with lost motion to the jointed strut, is preferably connected with lost motion to the latching device, for example by means of a link having a pin and slot connection with the latch.

Generally the undercarriage comprises for each landing wheel or the like a pair of legs pivoted to the body of the aircraft and a pair of jointed struts pivoted to the respective legs and to the body of the aircraft, said legs and struts lying in two spaced general planes on opposite sides of the landing wheel for example. With a guided chain for each such set comprising a leg and jointed strut arranged as described in accordance with the invention there is preferably provided a bridging member having at its end extensions entering the respective guide chutes and being attached to the respective chains, said bridging member being furthermore attached conveniently by links with the respective jointed struts. With such arrangement the bridging member may be pulled up or pushed down by direct forces applied at its ends through the chains and any wrenching effect upon the chain accordingly minimised.

Where each jointed strut is provided with a spring-pressed latch operated automatically to lock the jointed strut in the straightened position, namely corresponding to the undercarriage being fully extended, said bridging member is conveniently connected by links having lost-motion connection, for example pin and slot, with the jointed strut and being further connected by links affording lost-motion, for example by pin and slot, connection with the latches for the respective struts. With this arrangement upon thrust being applied to the chains, thereby to move the bridging member downwardly the hinged joints on the respective struts are closed and the latches thereby enabled automatically to lock the jointed struts, while upon withdrawal of the chains the initial effect of the consequential upward movement of the bridging member is to release the latches and thereafter to pull on the jointed struts for effecting retraction of the undercarriage, all in proper sequence.

By appropriate design of the working parts and selection of driving motor and associated gearing any desired high value of thrust for positively ensuring extension of the undercarriage under even the worst conditions liable to give rise to jamming of the operational parts may be obtained.

If the wheel-carrying legs are in the form of, or include as part thereof, shock absorbers as may generally be the case, the undercarriage may be associated with such shock absorbers in manner disclosed in the specification of copending application Serial No. 596,737 whereby the shock absorbers are utilised to assist the winches for effecting retraction as described in said application.

In order that the invention may be fully understood reference will now be made, by way of example, to the accompanying drawings, in which.

Figure 1:
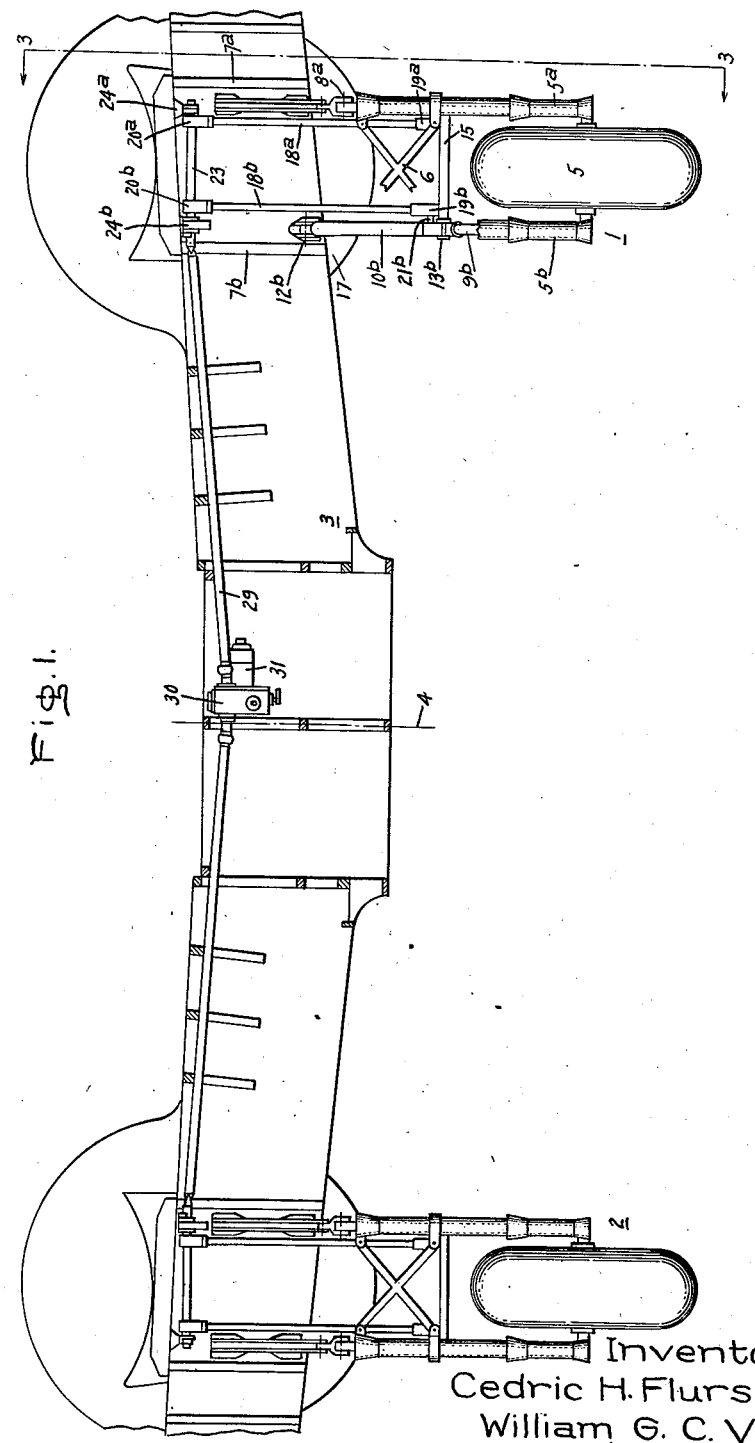
Fig. 1 is a somewhat diagrammatic elevational view of an aircraft equipped with an undercarriage arranged and operated in accordance with the invention, the view being taken looking at the front of the aircraft, and certain parts being omitted and others broken away for the purposes of simplification.
Figure 2:
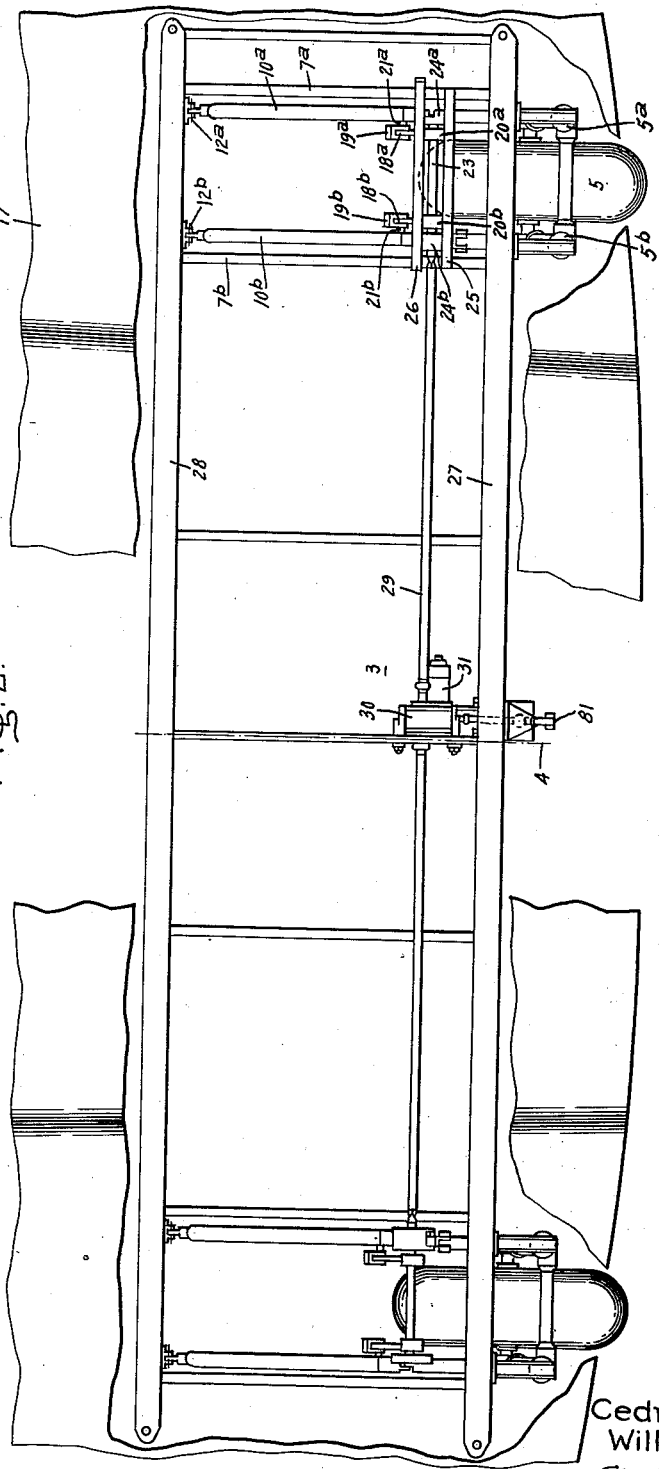
Fig. 2 is a plan view, also diagrammatic, and with certain parts omitted and others broken away for the purpose of simplification.
Figure 3:
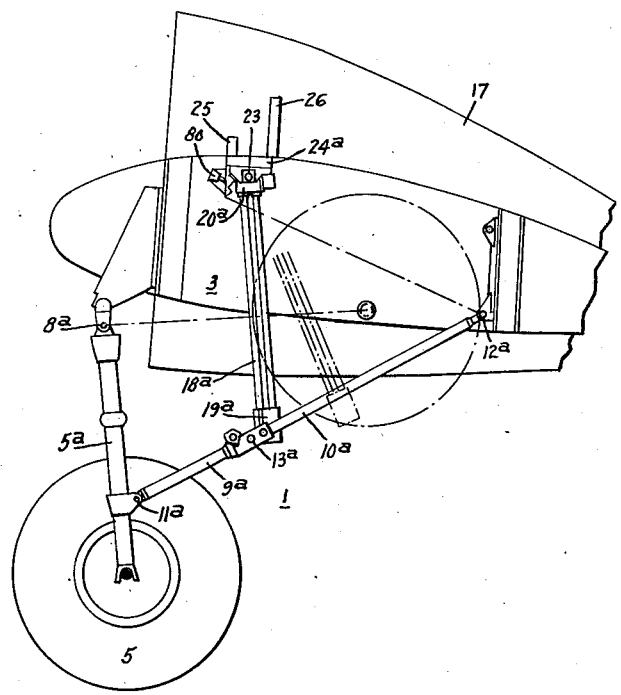
Fig. 3 is a view taken along the line III—III of Fig. 1.
Figure 4:
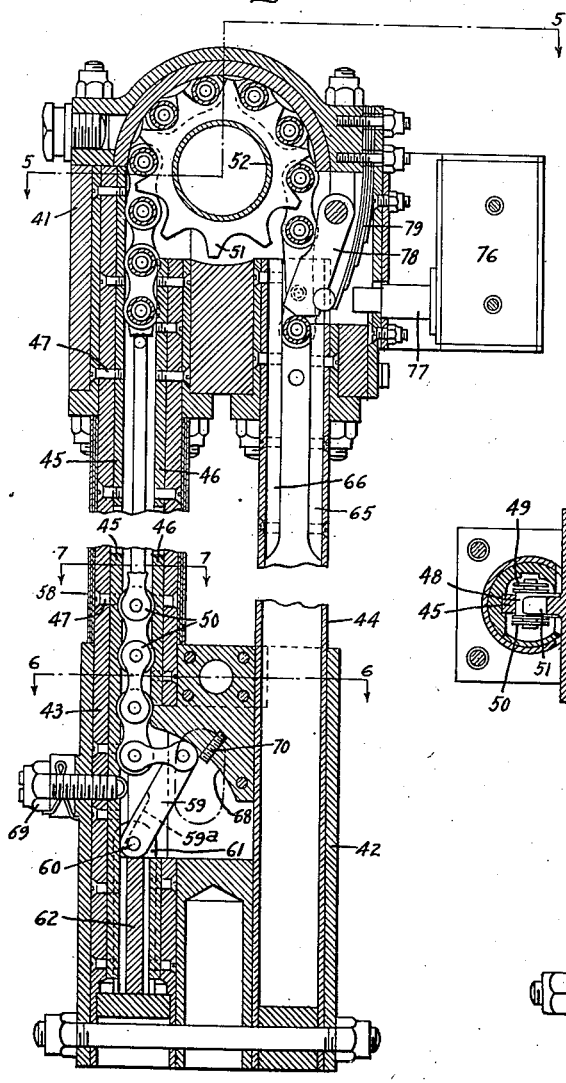
Fig. 4 is a sectional view of a preferred construction of chain guide and retracting mechanism for use in the aircraft of Figs. 1, 2 and 3, the section being taken in a plane at right angles to the axis of the driving sprocket.

Referring first to Figs. 1, 2 and 3, the aircraft therein shown is equipped with two identical retractable undercarriage gear units designated generally at 1 and 2 respectively, these units being secured to the aircraft, represented generally at 3, symmetrically with reference to the centre line of the aircraft, indicated at 4.

Since the retractable gear units are identical they will be described in respect of one of them, namely that designated 1 in the drawing. The retractable gear 1 comprises a landing wheel 5 resiliently mounted on legs 5a and 5b, braced together by the cross-frame 6, and pivoted to the aircraft 3 adjacent the outer and inner engine ribs indicated at 7a and 7b respectively, as shown at 8a for the leg 5a. The legs 5a and 5b are preferably each in the form of a resilient shock absorber now commonly employed and comprising telescopically resilient members, the relative movement of which is damped by fluid trapped at high pressure between the respective members.

The wheel-carrying leg 5a is arranged to be braced in the fully extended position shown by means of a "breakable" jointed strut or radius rod comprising a relatively short part 9a and a relatively longer part 10a, the short part 9a being pivoted at 11a to the wheel-carrying leg 5a and the longer part 10a being pivoted to the aircraft 3 at 12a to the rear of, and at about the same horizontal height as, the pivot 8a for the wheel-carrying leg 5a, and the parts 9a and 10a being connected together in a pivoted joint 13a.

The wheel-carrying leg 5b is adapted similarly to be braced by a breakable radius rod or jointed strut comprising parts 9b and 10b, the part 9b being pivoted to the leg 5b, and the part 10b being pivoted to the aircraft at 12b. The radius rod 9a, 10a is connected to the radius rod 9b, 10b by means of a cross-member 15.

It will be appreciated that the breakable radius rods 9a, 10a and 9b and 10b, together with the corresponding radius rods for the retractable gear 2, will be arranged to lie in a common general plane when the respective retractable gears are in the fully extended position shown.

For retracting the gear 1 there is provided operating mechanism comprising a jointed chain operating in a guide indicated generally at 18a, and shown as extending between a lower guide block 19a and an upper guide block 20a, the chain being attached by pin or rod 21a to the longer part 10a of the strut 9a, 10a and passing over a sprocket located in the guide block 20a. A similar chain operating in guide 18b extending between lower guide block 19b and upper guide block 20b, is attached at one end by a rod 21b to the part 10b of the radius rod 9b, 10b and passes over a sprocket located in the guide block 20b. The sprockets of the upper guide blocks 20a and 20b are fast to a shaft 23 which is pivoted in bearings 24a and 24b carried by cross-members 25 and 26 secured to the outer and inner engine ribs 7a and 7b which, as shown in Fig. 2, are supported by the front and rear spars 27 and 28.

The sprocket shaft 23 is coupled to shaft 29, conveniently supported in the wing 3 and coupled through gear box 30 to a reversible driving electric motor 31.

It will be appreciated that identical mechanism will be provided for retracting the gear 2, namely a pair of chains operating in respective guides and attached at one end to the radius rods of the gear while passing over sprockets fast to a shaft coupled through the gear box 30 to the driving motor 31.

Figure 5:
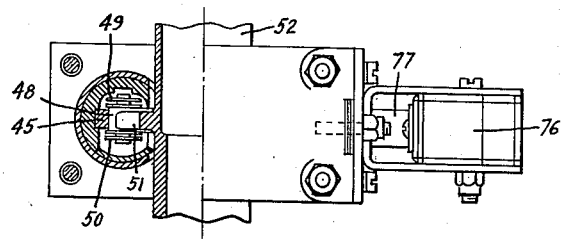
Fig. 5 is a view, partly in section, taken along the line V—V of Fig. 4.
Figure 6:
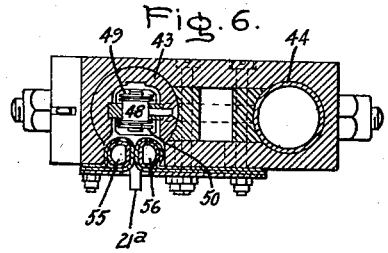
Fig. 6 is a cross-sectional view taken along the line VI—VI of Fig. 4.
Figure 7:
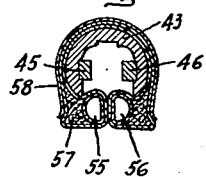
Fig. 7 is a sectional view taken along the line VII—VII of Fig. 4.

Referring now to Figs. 4 to 7 for the more detailed construction of the operating chain and guides designated 18a, 18b in Figs. 1 to 3, each guide comprises, as shown, an upper guide block 41 and a lower guide block 42 between which extend two guide chutes 43 and 44 opening into the guide blocks and lying in parallel side-by-side relation with one another. The guide chute 43 is substantially in the form of a tube having a longitudinal slot. Along the inner wall of the tube 43 and on opposite sides of the longitudinal slot therein, are fixed runners 45, 46, conveniently in the form of phosphor bronze strips fixed to the wall of the tube by studs 47. These runners 45, 46 are accurately spaced apart so as closely to engage the peripheral surface of jointing studs or rollers 48 of an ordinary bicycle roller chain, the jointed studs being linked together by pairs of side link-plates 49 and 50 respectively. The chain 48, 49, 50 passes from one end of the tube 43 to the other and over the teeth 51 of a sprocket which is mounted fast to spindle 52 in the upper guide block 41. The spindle 52 will be attached to the shaft 23 of Figs. 1, 2 and 3 together with the like spindle 52 for the driving sprocket of the other chain for the retractable gear 1. The sets of side link-plates 49 and 50 of the chain lie out of contact with the edges of the runners 45 and 46 as shown in Figs. 5 and 6, but by close engagement of the jointing studs or rollers 48 of the chain with the runners 45, 46 within the tube 44 the chain is rendered capable of transmitting motion by pushing as well as by pulling. The longitudinal slot in the tube 44 is packed by weather-sealing beads 55, 56 of a weather sealing cover 57 which is secured to the tube 44 along its whole length by spring clamp 58.

The jointing stud or roller 48 at the end of the chain extending through tube 44 is connected by a relatively long link 59 pivoted at 60 to a block 61 which is shown in engagement with an adjustable plug 62 accommodated in an axial bore in the lower guide block 42. It will be appreciated that at the pivot 60 attachment of the chain 48, 49, 50, 59 will be made to the radius rod 10a (Figs. 1, 2 and 3) by means of the aforesaid pin or bar 21a. By adjustment of plug 62 in the guide block 42, the end portion of the chain can be slightly raised relatively to the guide.

The tail or slack of the chain leaving the sprocket 51 is accommodated in the tube 44 which, as shown, is also fitted with runners 65, 66 attached to the tube 44 for closely engaging the jointing studs or rollers 48 of the tail of the chain for some little length of the chain leaving the sprocket.

In operation, it will be appreciated that, during the rotation of the sprocket 51 in the clockwise direction the chain 48, 49, 50 will be moved along the guide chute 43 and over the sprocket teeth 51, the tail of the chain moving away from the sprocket 52 along the chute 44. During such movement of the chain, the bar 21a (Figs. 1, 2, 3) attached to the pivot 60 of the lower link will move towards the axis of the sprocket 51, this bar 21a temporarily forcing apart the weather-sealing beads 55 and 56 during such motion. During rotation of the sprocket in the opposite direction the chain will be prevented from collapsing by engagement of the rollers 48 with the runners 45, 46 so that a thrust is applied to the bar 21a attached to the end pivot 60 of the chain and also attached to the radius rod 10a of the undercarriage (Figs. 1, 2 and 3).

In this embodiment the chain is adapted to act also as a means for latching the radius rod connected to it, when the radius rod is in the straightened position. Thus, in the lower guide block 42 at the lower end of guide tube 44 is a curved abutment 68, struck at a radius equal to the length of the end link 59 connecting the chain with the pin or bar 21a, and about the pivot 60. With this arrangement when the roller 48 attached to the end link 59 leaves the runner 46 in its movement away from the sprocket 51, it is enabled to move out of the line of the chain and along the abutment 68; in other words the end link of the chain and link 59 collapse. With the end of the chain collapsed in this manner, the links 9a, 10a (Figs. 1, 2, 3) of the radius rod to which the chain is attached, are locked in the straightened position, any tendency for the breaking of the joint between the parts 9a, 10a being restrained by engagement of the link 59 with the curved abutment 68. In order to assist in the initiation of the collapse of the chain as described, an adjustable stud 69 is arranged to project into the space in the lower guide block so as to engage a cam groove 59a in the link 59 and cause said link to pivot about the axis of roller 60 with its surface in contact with the curved abutment 68. The extent of pivoting of link 59, and thus collapse of the chain, is limited by stud 70 projecting from the surface 68 as shown.

It will be appreciated that the several chains will be of the same length and will be operated in unison for retracting and extending the gears 1 and 2, any slight adjustment of the stroke of the chains due to varying amount of tolerance in the respective gears being effected by means of the adjusting pins 62.

It is preferable to provide limiting switches controlling the extent of travel of the driving motor 31 (Figs. 1, 2) and conveniently for this purpose mechanically operable electric limit switches of the micro-switch type are provided in the embodiment being considered. Such switch, which will be associated with each operating chain, is indicated at 76 in Figs. 4 and 5, it being understood that the switch will comprise switch contacts operated by movement of plunger 77. The end of the plunger 77 is engageable by a latch 78 biased out of engagement with the plunger by the spring 79 but adapted to be thrown by engagement of the latch with rollers of the chain, accordingly to trip the driving motor 31 (Figs. 1, 2).

It will be appreciated that the guides 18a, 18b (Figs. 1, 2, 3) for the gear 1 and the corresponding guides for the gear 2 will rotate about the axis of the driving sprockets namely in the bearings as 24a, 24b (Figs. 1, 2, 3) during retraction and extension of the undercarriage.

Conveniently the gear 1 is maintained in the stowed-away position indicated in chain-dotted line by means of a latch 80, the gear 2 being likewise held in the stowed-away position by a similar latch.

In order that the retractable gears 1 and 2 can be operated by hand in an emergency, a hand lever 81 is coupled through the gear box 30 with the shafts 29 for operating the driving sprockets associated with the gears 1 and 2.

It will be appreciated that the invention is not limited to the precise form of undercarriage shown in the drawings.

What we claim as new and desire to secure by Letters Patent of the United States is:

1. A retractable under-carriage for aircraft having in combination a landing wheel having a pivoted supporting leg for carrying said landing wheel between a retracted position and an extended position, means including a toggle joint strut having a straightened position for bracing said leg in said extended position, operating means including a reversible winch having a link chain operated thereby and connected to pull said strut laterally for breaking said toggle joint and pulling said wheel to said retracted position upon operation of said winch in one direction, and guide means for maintaining said links of said chain in alignment to push said strut laterally into said straightened position and thereby return said wheel to said extended position upon operation of said winch in the opposite direction.

2. A retractable under-carriage for aircraft as claimed in claim 1 wherein said chain consists of interconnected pairs of side link-plates and jointing studs and wherein said guide means comprises a slotted chute substantially enclosing said chain and provided with spaced-apart parallel guide elements on opposite sides of said chain studs for maintaining said link-plates and studs in substantially linear alignment to impart a thrust to straighten said toggle joint strut during substantially the whole extension movement of said wheel.

3. A retractable under-carriage according to claim 1 wherein said winch is provided with a sprocket for operating said chain and wherein said guide means is pivotally mounted about the axis of said sprocket to maintain the links of said chain in alignment during both extension and retraction of the wheel.

4. A retractable under-carriage for aircraft having in combination a landing element having a pivoted supporting leg for carrying said landing element between a retracted position and an extended position, means including a jointed strut having a straightened position for bracing said leg in said extended position, operating means including a reversible winch having a link chain operated thereby and connected to pull said strut laterally for breaking said toggle joint and pulling said wheel to said retracted position upon operation of said winch in one direction, guide means for maintaining said links of said chain in alignment to push said strut laterally into said straightened position and thereby move said wheel into said extended position upon operation of said winch in the opposite direction, and means dependent upon a lateral displacement of a link of said chain for locking said toggle joint strut in said straightened position.

5. A retractable under-carriage for aircraft having in combination a landing wheel having a pivoted supporting leg for carrying said landing wheel between a retracted position and an extended position, means including a toggle joint strut having a straightened position for bracing said leg in said extended position, operating means including a reversible winch having a sprocket operated thereby, a jointed chain formed of pairs of side link-plates with jointed stud and rollers therebetween, means connecting the end of said chain with said strut adjacent the toggle-joint thereof for breaking said joint and pulling said wheel to said retracted position upon operation of said winch in one direction, and guiding means for said chain including a slotted chute pivotally mounted for movement about the axis of said sprocket and having spaced-apart longitudinal runners oppositely engaging said rollers of said chain for maintaining the length of said chain extending between said sprocket and said connection of said chain to said jointed strut in linear alignment whereby both pull and thrust can be transmitted through said chain to said strut for effecting retraction and extension respectively of said wheel upon rotation of the sprocket in opposite directions.

6. A retractable under-carriage as claimed in claim 5 wherein said means for connecting the end of said chain with said strut includes an elongated solid link and wherein said chute is provided with a curved recess for receiving said elongated solid link to lock said strut in said straightened position.

7. A retractable under-carriage according to claim 5 wherein a guide chute parallel to said first guide chute is provided for the tail part of said chain and rotatable therewith about the axis of said sprocket to maintain a portion of said chain in engagement with said sprocket substantially constant during the extension and retraction of said wheel.

CEDRIC HAROLD FLURSCHEIM.
WILLIAM GERALD COOKE VANCE.

REFERENCES CITED

The following references are of record in the file of this patent:

UNITED STATES PATENTS

| Number | Name | Date |
| --- | --- | --- |
| 1,329,533 | McCarroll | Feb. 3, 1920 |
| 1,812,211 | McCrea | June 30, 1931 |
| 1,894,582 | DeBell | Jan. 17, 1933 |
| 1,940,836 | Ayer | Dec. 26, 1933 |